United States Patent [19]

Gustafson

[11] Patent Number: 5,228,295
[45] Date of Patent: Jul. 20, 1993

[54] NO LOSS FUELING STATION FOR LIQUID NATURAL GAS VEHICLES

[75] Inventor: Keith Gustafson, Canton, Ga.

[73] Assignee: Minnesota Valley Engineering, New Prague, Minn.

[21] Appl. No.: 803,088

[22] Filed: Dec. 5, 1991

[51] Int. Cl.⁵ .................................. F25B 19/00
[52] U.S. Cl. .......................... 62/7; 62/50.1; 123/525
[58] Field of Search ................ 62/7, 50.1; 123/525

[56] References Cited

U.S. PATENT DOCUMENTS

| | | |
|---|---|---|
| 2,035,399 | 11/1934 | Murphy . |
| 2,257,897 | 10/1941 | Zenner et al. . |
| 2,384,677 | 9/1945 | Hill . |
| 2,487,863 | 11/1949 | Garretson ............... 62/50.1 |
| 2,645,906 | 7/1953 | Ryan . |
| 2,645,907 | 7/1953 | Droste et al. . |
| 2,912,830 | 11/1959 | Coldren et al. ........... 62/50.1 |
| 2,944,406 | 7/1960 | Anderson ............... 62/50.1 |
| 2,993,344 | 7/1961 | Reed . |
| 3,183,678 | 5/1955 | Hosford . |
| 3,272,238 | 9/1966 | Groppe ................. 62/50.1 |
| 3,898,853 | 8/1975 | Iung . |
| 4,018,582 | 4/1977 | Hinds et al. . |
| 4,406,129 | 9/1983 | Milis . |
| 4,449,509 | 5/1984 | Young . |
| 4,531,497 | 7/1985 | Smith . |
| 5,127,230 | 7/1992 | Neeser et al. ............ 62/50.1 |

FOREIGN PATENT DOCUMENTS 3233935 3/1984 Fed. Rep. of Germany .
0251598 11/1987 Japan .

*Primary Examiner*—Ronald C. Capossela
*Attorney, Agent, or Firm*—Rockey, Rifkin and Ryther

[57] ABSTRACT

The fueling station of the invention consists of a vacuum insulated storage tank for storing large quantities of LNG at low pressure. A delivery line connects the LNG in the storage tank with a fill line to engage the use device such as a vehicle's fuel tank at the fueling station. A meter is provided to deliver a metered amount of LNG to the vehicle. A pump is used to sub-cool the LNG and convey it from the storage tank to the delivery hose and an eductor is provided to gradually draw vaporized LNG from the storage tank into the delivery line. The fill line, pump, eductor and delivery hose are vacuum jacketed to prevent vaporization of the LNG. A circulation loop is provided to sub-cool the pump, eductor and meter prior to delivering LNG to the vehicle in order to ensure that vaporized natural gas is not delivered to the use device. In an alternate embodiment a heat exchanger using LN$_2$ or other coolant can be used in place of the pump to sub-cool the LNG.

26 Claims, 2 Drawing Sheets

NO LOSS FUELING STATION FOR LIQUID NATURAL GAS VEHICLES

BACKGROUND OF THE INVENTION

This invention relates, generally, to liquid natural gas (LNG) delivery systems and, more specifically, to a no loss fueling station for LNG particularly suited for use with natural gas powered motor vehicles.

In recent years great efforts have been made to find a cheap and reliable domestic energy alternative to oil. One such alternative fuel is natural gas which is domestically available, plentiful and relatively inexpensive and environmentally safe as compared to oil. Because one of the largest uses for oil is as a fuel for motor vehicles, great strides have been made to develop engines which run on alternative fuels such as natural gas.

One such engine runs on a 60/40 diesel fuel to LNG mixture which requires that LNG be delivered to the engine at approximately 300 psi, a pressure approximately 6 times the normal storage pressure for LNG. Other natural gas powered engines require that the LNG be delivered at pressures ranging from less than 50 psi to more than 500 psi. Therefore, a LNG fueling station that can deliver LNG to vehicles having wide variations in delivery requirements is desired.

Moreover, LNG is an extremely volatile substance that is greatly affected by changes in pressure and temperature. As a result, the fueling station must be able to accommodate fluctuations in pressure and temperature and transitions between the liquid and gas states. Further, the fueling station must be able to deliver LNG to vehicle fuel systems which are under various pressure and temperature conditions. Optimally, the fueling station should be able to meet these conditions without wastefully venting LNG to the atmosphere, i.e. the fueling station should result in no loss of LNG or natural gas.

Thus a no loss LNG fueling station that can efficiently deliver LNG through a range of temperatures and pressures is desired.

SUMMARY OF THE INVENTION

The fueling station of the invention consists of a vacuum insulated storage tank for storing large quantities of LNG at low pressure. A delivery line connects to LNG in the storage tank with a fuel fill line designed to engage the use device such as a vehicle's fuel system. A pump is located in the delivery line to sub-cool the LNG and convey it from the storage tank to the delivery line and a meter is provided to meter the amount of LNG delivered to the vehicle. Further, an eductor is provided in the delivery line to gradually vent natural gas from the storage tank and mix it with the LNG being delivered to the use device. The fill line, delivery line, pump, eductor and meter are vacuum jacketed to minimize heat transfer to the LNG. A circulation loop is provided to sub-cool the pump, eductor and meter prior to delivering LNG to the vehicle in order to ensure that vaporized natural gas is not delivered to the vehicle. In an alternate embodiment, a heat exchanger using LN$_2$ or other coolant is used in place of the pump to sub-cool the LNG.

DETAILED DESCRIPTION OF THE INVENTION

Figure 1:
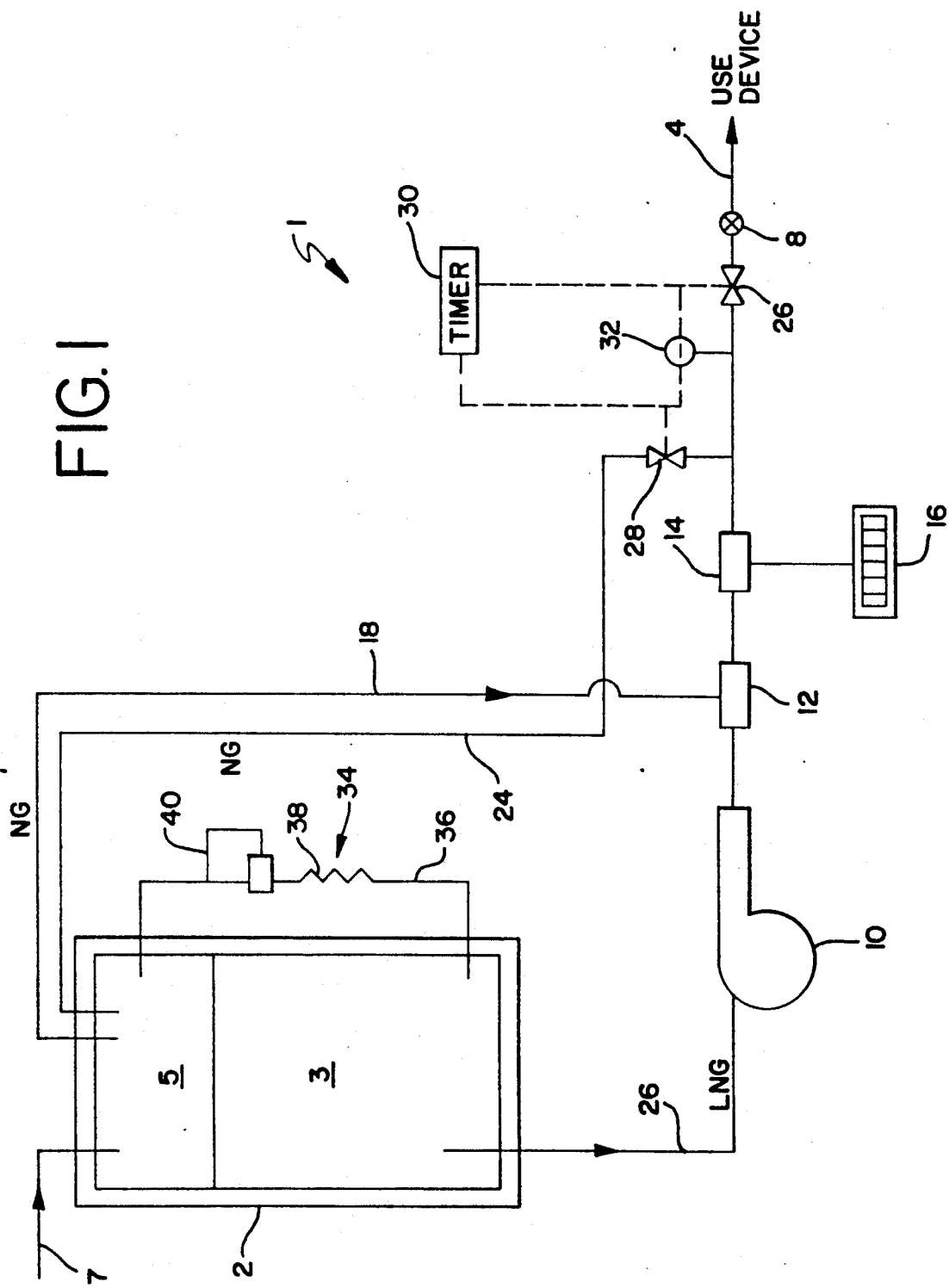
FIG. 1 is a schematic view of the no loss delivery system of the invention.

FIG. 1 shows the delivery system of the invention generally at 1 consisting of a large volume, low pressure storage tank 2. Tank 2 is of a double-walled, vacuum insulated construction as is typical in the storage of cryogenic fluids. Preferably, tank 2 stores 9,000 50,000 gallons of liquid cryogen such as LNG. A gas head 5 will form above the LNG 3 due to the inevitable heat transfer between the external environment and LNG 3. Preferably gas head 5 will pressurize tank to approximately 15-35 psi.

Tank 2 is filled from a low pressure truck trailer mounted tank either by gravity with a vapor return or by a trailer mounted centrifugal pump via line 7. Preferably, the delivery operation is conducted at low pressure such that the largest volume of cryogen can be delivered through the system with the fewest operating restrictions.

Tank 2 is designed such that the pressure in the tank will not rise above a predetermined maximum, for example 35 psi. This can be accomplished by designing the tank's insulation and volume to control the heat transferred to the LNG such that the LNG will be very nearly depleted when the pressure in the tank nears the maximum value. The delivery of more LNG to refill tank 2 will lower the pressure in the tank as the cold LNG condenses some of the natural gas in head 5. As a result, LNG will not have to be vented from the system. Moreover, an eductor 12 is used in the delivery line to gradually deliver a small quantity of the gas head 5 to the use device thereby to reduce the pressure in tank 2 as will hereinafter be described.

Storage tank 2 is connected to fuel delivery hose 4 at the fueling station by a vacuum jacketed delivery line 6. A quick connect fitting 8 connects delivery line 6 to fill line 4. Fuel delivery line 4 is provided with a nozzle (not shown) engageable with the use device, for example the vehicle's fuel tank. The vehicle's tank should be provided with a means for relieving the pressure that builds up during the fill operation.

Located in delivery line 6 is a vacuum jacketed transfer pump 10, an eductor 12 and a meter 14. Pump 10 sub-cools the LNG being delivered through line 6 by increasing the pressure of the LNG as will be appreciated by one skilled in the art. Sub-cooling means that the LNG is at a temperature below its equilibrium temperature for a given pressure. Meter 14 is connected to a numeric readout 16 which visually indicates to the system operator the amount of fluid delivered by the system in a manner similar to that presently in use at gasoline pumps.

Figure 2:
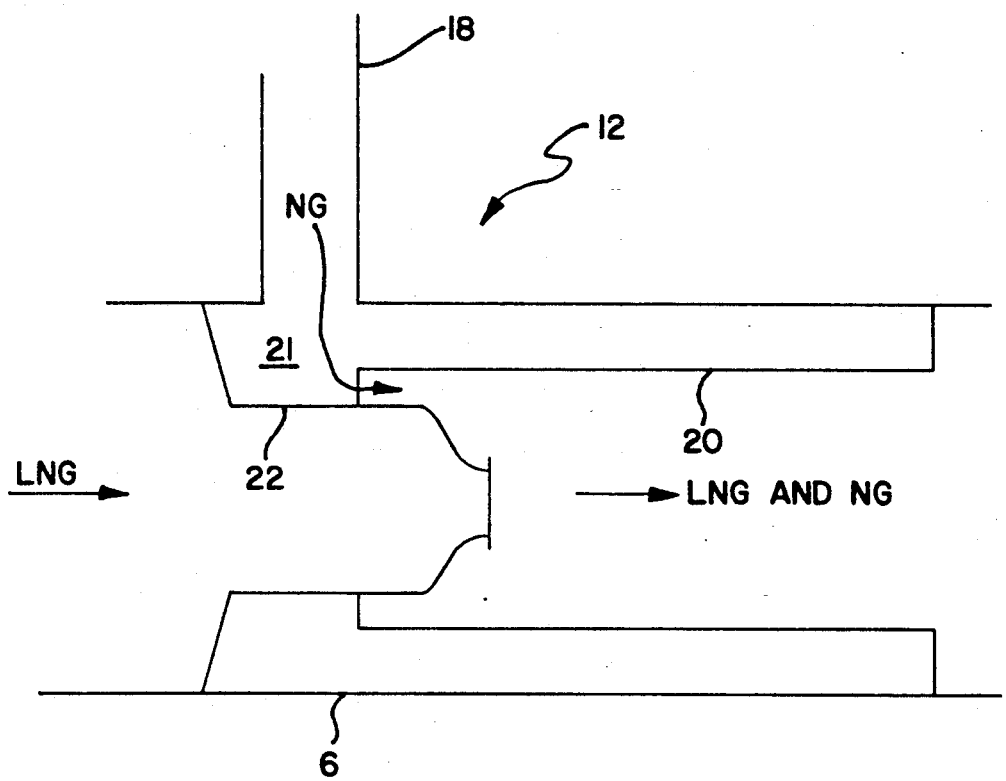
FIG. 2 is a section view showing a preferred form of the eductor used in the delivery system of the invention.

The eductor 12 is used to deliver a small amount of natural gas from tank 2 to delivery line 6 via vapor line 18. Eductor 12 is shown schematically in greater detail in FIG. 2 and consists of a first tube 20 located inside of delivery line 6. A second tube 22 is located inside of tube 20 and is connected to line 6 to create a Venturi effect of the LNG passions therethrough. Line 18 is connected to line 6 such that as LNG is forced through tube 22 by pump 10 a small portion of the natural gas in tank 2 will be drawn through line 18 and into the stream of LNG in line 6. Because the volume of LNG flowing through line 6 is much greater than the volume of natural gas drawn through line 18, the natural gas will be condensed as it contacts the LNG and will be delivered to the use device as LNG. Because eductor 12 draws natural gas from head 5 in tank 2 it reduces the pressure in the tank to help maintain the pressure therein below the predetermined maximum pressure. The relatively small amount of natural gas introduced into line 6 does not noticeably degrade the quality of the LNG delivered to the vehicle. A regulator located in line 18 limits back pressure, the pressure drop in the bulk tank to approximately 15 psi.

Conversely, with reference to FIG. 1, a pressure building circuit 34 is provided to ensure that tank 2 will always be operating under the minimum desired pressure, i.e. 15 psi, the minimum pressure being the pressure required to ensure flow of LNG from tank 2 through line 6. Pressure building circuit 34 consists of a pressure building line 36 connecting the LNG 3 with gas head 5. A vaporizer coil 38 (heat exchanger) is located in line 36 to vaporize the LNG therein thereby to deliver it to the head 5 as a gas. When the LNG is vaporized it expands to increase the pressure in the system as will be appreciated by one skilled in the art. A pressure regulator 40 is provided in line 36 to allow LNG to flow through pressure building circuit 34 only when it senses a pressure in head 5 below the desired minimum.

A vapor return line 24 connects line 6 to the LNG in tank 2. LNG is circulated through the circuit created by lines 6 and 24 to pre-cool the pump 10, eductor 12 and meter 14 before the LNG is delivered to the use device. If these components were not pre-cooled, they would transfer heat to the LNG as it passed therethrough such that an undesirable portion of the LNG would be vaporized and the product delivered to the vehicle degraded. Vapor line 24 allows any vaporized product to be delivered back to tank 2 where it is recondensed upon contact with the LNG therein.

A pair of automatically controlled valves 26 and 28 are located in lines 6 and 24 to control the flow of product through the system. The operation of valves 26 and 28 can be controlled either by a timing circuit 30 or by pressure switch 32 as will hereinafter be described.

To describe the operation of the system, assume that tank 2 is filled with LNG and is operating under a pressure within the desired 15–35 psi range. When a demand is made on the system for delivery of LNG to the use device (such as filling of a vehicle at a fueling station), operation of pump 10 is initiated, valve 28 is opened and valve 26 is closed. Because the pump 10 and meter 12 will be relatively warm as compared to the LNG, heat will be transferred from the pump and meter to the LNG. As a result, the pump and meter are cooled to the temperature of the LNG and a portion of the LNG is vaporized. Because valve 26 is closed and valve 28 is open the vaporized LNG will not be delivered to the vehicle, rather it will be recirculated back to tank 2 via line 18 where it will be recondensed upon contact with LNG 3 and stored for further use.

After the pump 10 and meter 12 have been pre-cooled, the pump star. Then valve 28 will be closed and valve 26 will be opened to allow flow of the LNG to the use device. The operation of valves 26 and 28 is controlled either by timing circuit 30 which, after pre-cooling, operates the valves or by pressure switch 32 which senses the change in pressure as the vaporization of the LNG ceases and operates valves 26 and 28 accordingly.

As the delivery of LNG proceeds, eductor 14 will cause a small quantity of natural gas from head 5 to be entrained in the LNG and delivered to the vehicle via delivery line 6. The operation of eductor 12 minimizes the pressure build-up in tank 2 without the need for venting and without adversely affecting the quantity and quality of the LNG delivered to the use device. Finally, pressure building coil 34 is actuated whenever the pressure in tank 2 falls below the predetermined minimum such as, for example, when sub-cooled LNG is initially delivered to the tank and head 5 hasn't had time to form naturally.

Figure 3:
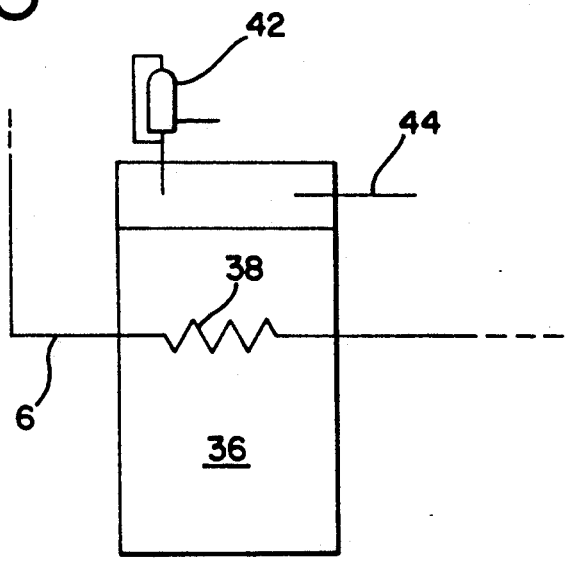
FIG. 3 is a schematic view of an alternate embodiment of the sub-cooler used in the delivery system of the invention.

In an alternate embodiment of the invention, the transfer pump 10 of the preferred embodiment is replaced by a sub-cooler, shown in FIG. 3, which uses a coolant such as liquid nitrogen ($LN_2$) to sub-cool the LNG. Specifically, delivery line 6 passes through a bath 36 of $LN_2$. Because $LN_2$ is relatively cold as compared to LNG, the LNG leaving bath 36 is sub-cooled. A coil 38 is provide to maximize heat transfer between the $LN_2$ and LNG. A pressure relief valve 42 is provided to vent vaporized $LN_2$ (i.e. the nitrogen gas created by the heat transfer from the LNG) to the atmosphere when the pressure in bath 36 rises above a predetermined maximum. A fill line 44 is provided to periodically replenish the supply of $LN_2$.

In this alternate embodiment, because pump 10 is not used to sub-cool the liquid, the LNG must be driven through the system by the pressure in tank 2. Thus pressure building coil 38 will be required to maintain the pressure in tank 2 at a slightly higher level than was the case in the preferred embodiment.

While the invention has been shown and described in some detail, it is to be understood that the foregoing description and drawings are offered merely by way of example and that the invention is to be limited only as set forth in the claims.

What is claimed is:

1. A no loss liquid natural gas (LNG) delivery system comprising:
   (a) means for storing LNG and natural gas a low pressure;
   (b) means for delivering LNG from the means for storing to a use device including means for sub-cooling the LNG;
   (c) means for pre-cooling the means for sub-cooling before the LNG is delivered to the use device to substantially reduce vaporization of the initial LNG delivered to the use device; and
   (d) means for delivering a selectable quantity of the natural gas in said storing means to said use device with the LNG.

2. The delivery system according to claim 1, wherein the means for sub-cooling includes a transfer pump.

3. The delivery system according to claim 1, wherein the means for pre-cooling includes means for delivering a quantity of LNG through said pump, said quantity of LNG not being delivered to said use device.

4. The delivery system according to claim 3, wherein said means for pre-cooling includes recirculation means for delivering said quantity of LNG back to said means for storing LNG.

5. The delivery system according to claim 1, further including means for metering the LNG delivered to the use device.

6. The delivery system according to claim 5, wherein said means for pre-cooling pre-cools said meter.

7. The delivery system according to claim 1, wherein said means for pre-cooling pre-cools said vent means.

8. The delivery system according to claim 4, further including means for controlling operation of said recirculation means.

9. The delivery system according to claim 8, wherein said means for controlling consists of automatically operating valves which selectively control flow of LNG through said recirculation means.

10. The delivery system according to claim 9, wherein said valves are operated by a timer.

11. The delivery system according to claim 9, wherein said valves are operated by a pressure switch.

12. The delivery system according to claim 1, further including means for building the pressure in said means for storing LNG.

13. A no loss LNG delivery system comprising:
   (a) means for storing a quantity of LNG and natural gas at low pressure;
   (b) means for delivering LNG from the means for storing to a use device including means for sub-cooling the LNG to insure its delivery as a liquid; and
   (c) means for gradually delivering a portion of the natural gas from the means for storing to the means for delivering LNG to reduce the pressure in the means for storing.

14. The delivery system according to claim 13, wherein said means for delivering the natural gas from the means for storing includes an eductor.

15. The delivery system according to claim 13, further including means for pre-cooling the means for sub-cooling the LNG to substantially reduce vaporization of the initial LNG delivered to the use device.

16. The delivery system according to claim 15, wherein the means for pre-cooling includes means for delivering a quantity of LNG through said pump, said quantity of LNG not being delivered to said use device.

17. The delivery system according to claim 13, wherein the means for sub-cooling consists of a heat exchanger submerged in a bath of coolant through with the LNG passes.

18. The delivery system according to claim 13 wherein the means for sub-cooling includes a transfer pump.

19. The delivery system according to claim 13, further including means for metering the LNG delivered to the use device.

20. The delivery system according to claim 19, wherein said means for pre-cooling pre-cools said means for metering.

21. The delivery system according to claim 16, wherein said means for pre-cooling includes recirculation means for delivering said quantity of LNG back to said means for storing LNG.

22. The delivery system according to claim 21, further including means for controlling operation of said recirculation means.

23. The delivery system according to claim 22, wherein said means for controlling consists of automatically operating valves which selectively control flow of LNG through said recirculation means.

24. The delivery system according to claim 23, wherein said valves are operated by a timer.

25. The delivery system according to claim 23, wherein said valves are operated by a pressure switch.

26. The delivery system according to claim 13, further including means for building the pressure in said means for storing LNG.

* * * * *